(12) United States Patent  
Kang

(10) Patent No.: US 6,857,229 B2
(45) Date of Patent: Feb. 22, 2005

(54) DOOR WINDOW LIFTING APPARATUS OF A VEHICLE

(75) Inventor: Hee-Won Kang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/326,011

(22) Filed: Dec. 18, 2002

(65) Prior Publication Data

US 2003/0196384 A1 Oct. 23, 2003

(30) Foreign Application Priority Data

Apr. 19, 2002 (KR) .......................... 2002-21500

(51) Int. Cl.⁷ .............................................. E05F 11/38
(52) U.S. Cl. ...................................................... 49/375
(58) Field of Search .......................... 49/374, 375, 348, 49/349, 350, 351

(56) References Cited

U.S. PATENT DOCUMENTS

| | | | |
|---|---|---|---|
| 3,466,803 A * | 9/1969 | Packett | ........................ 49/441 |
| 4,432,165 A | 2/1984 | Ishi | |
| 4,457,109 A | 7/1984 | Royse | |
| 4,669,222 A | 6/1987 | Ujihara et al. | |
| 4,794,733 A | 1/1989 | Kanemaru | |
| 4,829,630 A | 5/1989 | Church et al. | |
| 4,935,986 A | 6/1990 | Church et al. | |
| 5,036,621 A * | 8/1991 | Iwasaki | ........................ 49/428 |
| 5,065,545 A | 11/1991 | Kane et al. | |
| 5,101,596 A | 4/1992 | Moore | |
| 5,243,785 A | 9/1993 | Nieboer et al. | |
| 5,392,563 A | 2/1995 | Cardine | |
| 6,044,589 A | 4/2000 | Dallos, Jr. | |
| 6,295,762 B1 * | 10/2001 | Nemoto | ........................ 49/374 |

FOREIGN PATENT DOCUMENTS

| | | |
|---|---|---|
| DE | 0 373 301 | 1/1989 |
| EP | 0 255 811 | 7/1987 |
| EP | 0 389 873 | 3/1990 |

* cited by examiner

*Primary Examiner*—Jerry Redman
(74) *Attorney, Agent, or Firm*—Morgan Lewis & Bockius LLP

(57) ABSTRACT

The present invention relates to a door window lifting apparatus of a vehicle in which a guider having a horizontal guide groove is connected with a regulator arm by a roller body. The roller body has a first and second elastic pad to result in no gap at the guider, thereby preventing noise from being generated in the lifting process of the door window of a vehicle.

5 Claims, 3 Drawing Sheets

DOOR WINDOW LIFTING APPARATUS OF A VEHICLE

FIELD OF THE INVENTION

The present invention relates to a door window lifting apparatus for a vehicle.

BACKGROUND OF THE INVENTION

A conventional door window lifting apparatus of a vehicle includes a holder positioned beneath a door window and a guider, with a guide groove, horizontally welded beneath the holder. Typically a regulator arm moves along the guide groove to operate the window either up or down. Often a roller is rotatably installed between the regulator arm and the guide groove to reduce friction associated with rolling up or down the window.

However, there is a drawback in the conventional door window lifting apparatus in that an irregular sound is generated when the window is rolled up or down. The noise occurs because the roller gradually wears out due to the repeated sliding motion of raising and lowering the window.

SUMMARY OF THE INVENTION

The present invention provides a door window lifting apparatus for a vehicle that reduces frictional noise between a roller and a guider in spite of many repeated raisings and lowerings of the door window, thereby preventing discomfort to the driver and its passengers.

In accordance with one embodiment of the present invention, a door window lifting apparatus for a vehicle comprises a holder for supporting both sides of the bottom of a door window. Also included is a guider welded to the holder with a horizontal guide groove. A roller is also included and rotatably installed at the end of a regulator arm that is vertically rotated by a regulator motor. The other end of the regulator arm is inserted into the guide groove of the guider. The roller comprises a roller body formed with a first and second circular grove. One groove being around the external circumference of the roller and the other circular groove being around one side of the roller. The first and second circular grooves are filled with a first and second elastic pad, inserted into the first and second circular grooves and protruding therefrom. The protruding portion of the first and second elastic pad contacts the inner surface of the guider, thereby forming a low friction and low wear bearing surface.

BRIEF DESCRIPTION OF THE DRAWINGS

The features and advantages of the present invention will become apparent from the detailed description of the present invention with reference to the accompanying drawings in which.

DETAILED DESCRIPTION OF THE INVENTION

Figure 1:
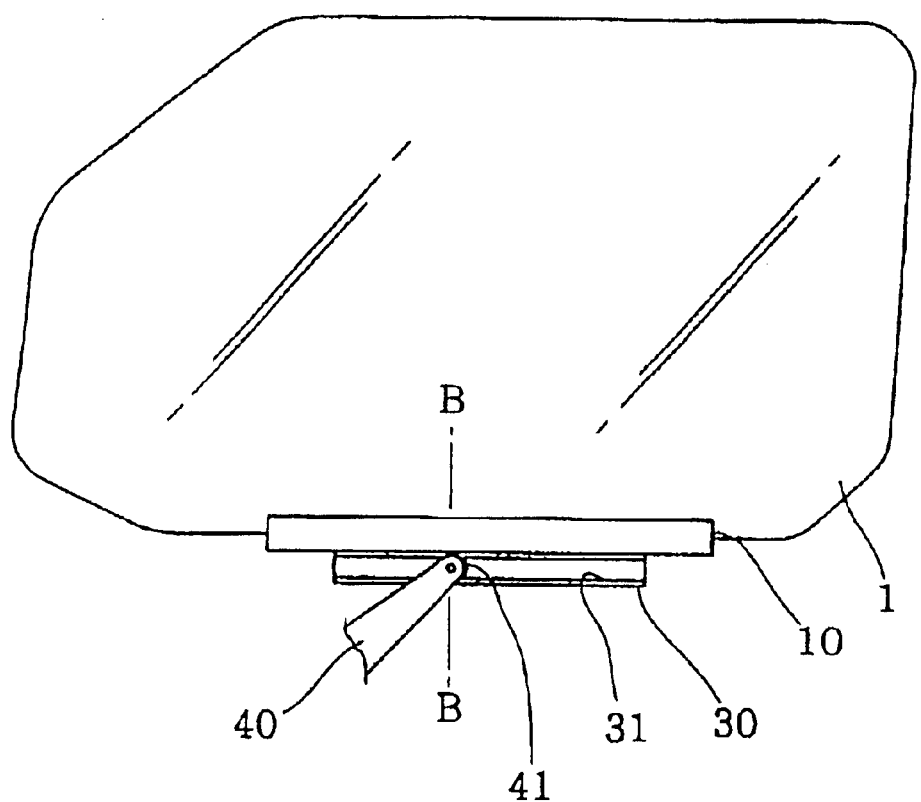
FIG. 1 is a schematic structural view illustrating a conventional door window lifting apparatus.
Figure 2:
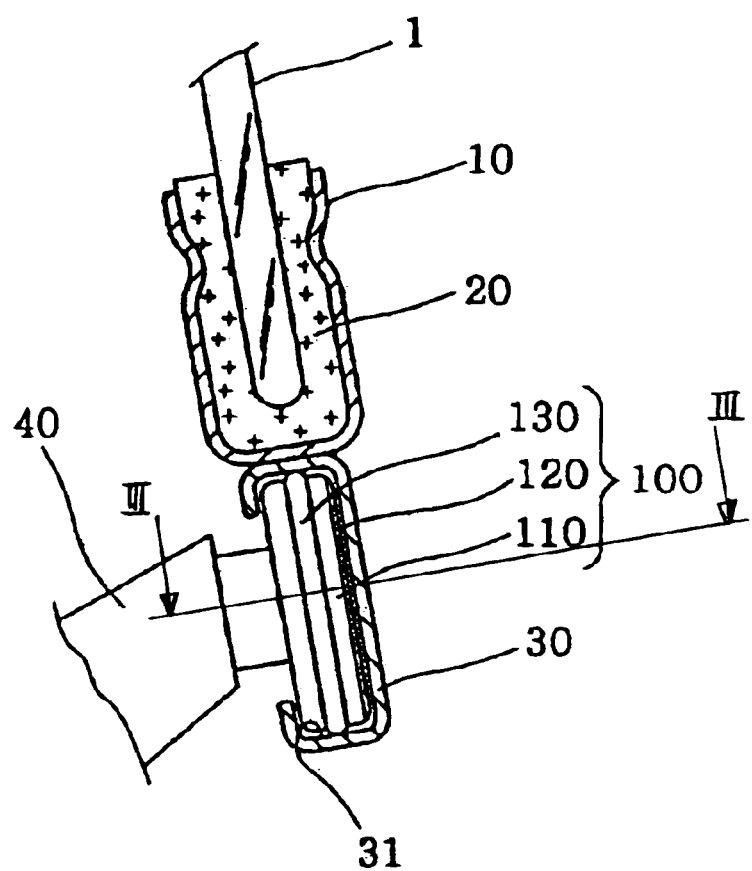
FIG. 2 is a cross-sectional view taken along line B—B of FIG. 1 illustrating a part of a door window lifting apparatus according to an embodiment of the present invention.

Referring to FIGS. 1 and 2, in one embodiment of the invention, a holder 10 is positioned at the bottom surface of a door window 1. A guider 30 is welded beneath the holder 10 with a horizontal guide groove 31. An end of a regulator arm 40 vertically rotated by a regulator motor (not shown) is inserted into the guide groove 31. A roller 100 is rotatably installed at the end of the regulator arm 40 for reducing friction when the regulator arm 40 slides along the guide groove 31.

Figure 3:
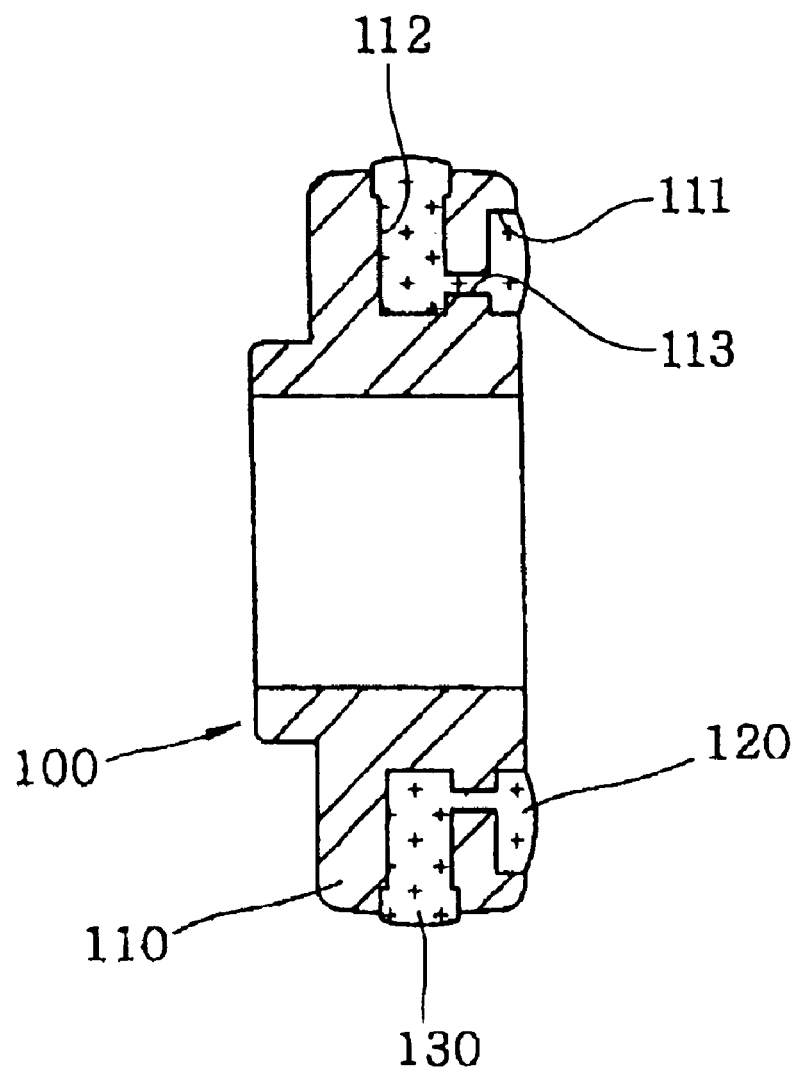
FIG. 3 is a cross-sectional view taken along line III—III of FIG. 2 illustrating a roller according to an embodiment of the present invention.

In a preferred embodiment the roller 100 consists of a roller body 110 and first and second elastic pads 120 and 130. It is preferable that the roller body 110 is made of a light material, such as for example, light synthetic resin or metal. The roller body 110 is formed with first and second circular grooves 111 and 112 (FIG. 3). The first circular groove 111 is a groove in the outer surface of the roller body 110 (FIG. 3). The second circular groove 112 is a groove around the outer circumference of the roller body 110 (FIG. 3).

The first and second elastic pads 120 and 130 are inserted into the first and second grooves 111 and 112 of the roller body 110. It is preferable that the first and second elastic pads, 120 and 130, protrude from one side of the roller body 110 and external circumference of the roller body 110.

In a preferred embodiment the first and second elastic pads 120 and 130 are made of a plastic material, such as, for example, a Thermo Plastic Elastomer (TPE). The TPE can be molded at a high temperature and retain elasticity at room temperature. It is stressed that the first and second elastic pads 120 and 130 are not restricted to TPE, as any lightweight material that is non-abrasive and has a high elasticity will work.

It is preferable that the first and second elastic pads 120 and 130 are integrally formed by insertion into the roller body 110. To integrally insert the first and second elastic pads 120 and 130 into the first and second circular grooves 111 and 112 of the roller body 110, the first and second circular grooves 111 and 112 are mutually connected through a plurality of throughholes 113 (FIG. 3). It is preferable that the first and second elastic pads 120 and 130 are injected through the throughholes 113 into the first and second circular grooves 111 and 112. Thereby, the first and second elastic pads 120 and 130 are integrally molded onto the body 110.

In a preferred embodiment there is no gap between the roller 100 and the guider groove 31.

In a preferred embodiment the first and second elastic pads 120 and 130 consist of an elasticity which facilitates easy insertion of the guider 30 into the guide groove 31. Furthermore, the elasticity of the first and second elastic pads 120 and 130 facilitate durability for resisting wear following repeated lifting of the door window 1, thereby preventing noise caused by abrasions.

The above descriptions of specific embodiments of the present invention are presented for purposes of illustration and description. They are not intended to be exhaustive or to limit the invention to the precise disclosures. The present disclosure is therefore to be considered in all respects illustrative and not restrictive. The scope of the invention is to be defined by the claims and all the equivalents thereof.

What is claimed is:

1. A door window lifting apparatus for a vehicle having a holder for supporting both sides of a bottom of a door window, a guider welded to the holder with a horizontal guide groove and a roller rotatably installed at the end of a regulator arm vertically rotated by a regulator motor and inserted into the guide groove of the guider, wherein the roller comprises:

a rotatable roller body formed at an external circumference and one side thereof with first and second circular grooves; and first and second elastic pads inserted into the first and second circular grooves wherein said first and second elastic pads protrude from the external circumference of the roller body for contacting an inner side and the inner upper and inner lower surfaces of the guider and wherein said first and second elastic pads rotate with the roller integrally, and wherein the first and second circular grooves of the roller body are mutually connected through a plurality of throughholes for insertion of the first and second elastic pads.

2. A door window lifting apparatus for a vehicle, comprising:

a holder configured to transfer a force from a motor to move a window up and down;

a holder configured to hold the window and couple with said arm; and a rotatable roller defining a first groove and a second groove wherein said first and second grooves are configured to receive a sliding member, the sliding member being configured to rotate with the rotatable roller, and wherein said holder is configured to receive said rotable roller for rotatable coupling, wherein said rotatable roller defines holes therethrough such that said first groove and said second groove are interconnected.

3. The apparatus of claim 2, wherein said sliding member is a lightweight material that is non-abrasive and has a high elasticity.

4. The apparatus of claim 2, wherein said rotatable roller is a wheel.

5. A door window lifting apparatus for a vehicle, comprising:

an arm configured to transfer a force from a motor to move a window up and down;

a holder configured to hold the window and couple with said arm; and a rotatable roller defining a first groove and a second groove and holes therethrough such that said first groove and said second groove are interconnected, wherein said first and second grooves are configured to receive a sliding member and wherein said holder is configured to receive said roller for rotatable coupling.

* * * * *